United States Patent Office 3,539,265
Patented Nov. 10, 1970

3,539,265
AIMING FACILITY HAVING COLLIMATION MARKS IN AN UNLIMITED ANGLE OF FIELD INCLUDING A SPHERICAL RETICULE
Andre Marquet, Paris, France, assignor to Societe d'Optique, Precision, Electronique et Mecanique "SOPELEM," Paris, France
Filed July 20, 1967, Ser. No. 654,795
Claims priority, application France, July 29, 1966, 71,357
Int. Cl. G02b 23/10
U.S. Cl. 356—251
4 Claims

ABSTRACT OF THE DISCLOSURE

An aiming facility with collimation marks in an unlimited angle of field, the facility comprising a collimating system formed by a partly reflecting mirror, a totally reflecting mirror, an objective, a reticule and viewer in which the image of a point at infinity is superimposed upon such point of the reticule as corresponds to the direction of the point at infinity, the reticule is inscribed on a sphere, and the viewer cooperates with the objective and collimating mirrors to form a system rotatable around a horizontal axis and around a vertical axis passing through the centre of the sphere.

---

This invention relates to an aiming facility having collimation marks in an unlimited angle of field.

Aiming facilities using collimation are known which comprise a viewer, formed by a lens, an eye piece and, if required, image-inverting mirrors, and a collimating system comprising a partly-reflecting mirror, a dioptric or catadioptric lens, and a reticule. In aiming devices of this kind, the image of any point at infinity has superimposed upon it, in the image plane of the viewer lens, such point of the reticule as corresponds to the direction of the point at infinity. Since the viewer is rigidly connected to the collimating system, the collimation field cannot be greater than the necessarily limited field of the viewer.

It is an object of this invention to provide an aiming facility which can, in cooperation with a normal-field viewer, collimate directions in a field possibly covering substantially the entire surface of a sphere. According to the invention, the reticule is inscribed on a sphere, and the viewer cooperates with the collimating mirrors to form a rigid system rotatable around a horizontal axis and around a vertical axis passing through the centre of the sphere.

The invention will be described hereinafter with reference to the accompanying drawings wherein.

Figure 1:
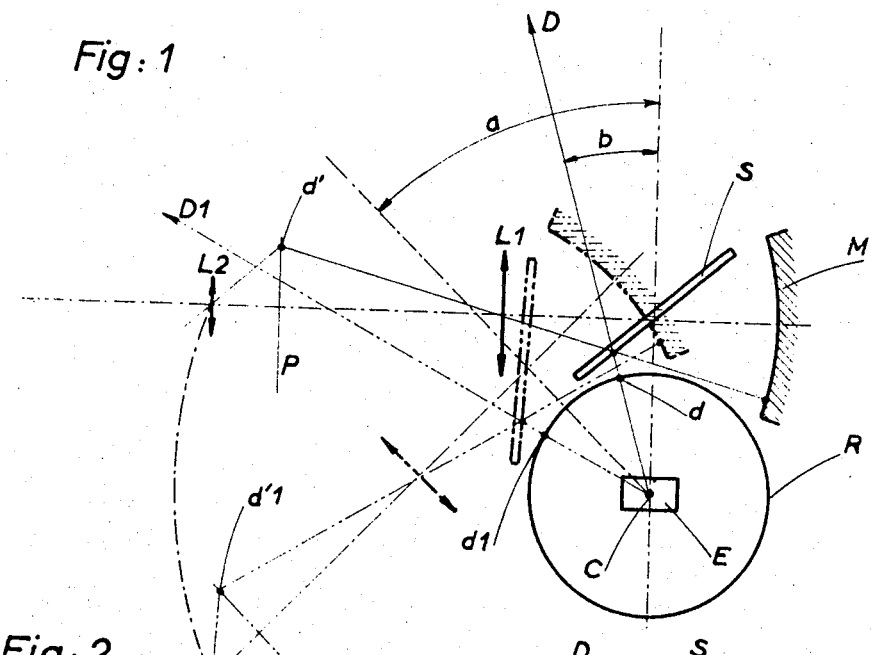
FIG. 1 is a basic diagram of a collimating aiming facility.

In the diagram shown in FIG. 1, the aiming facility comprises an object-glass or objective $L_1$ and an eyepiece $L_2$, the image plane P being disposed at the focus of the objective $L_1$. The collimating system comprises, on the optical axis of the objective $L_1$, a semi-reflecting flat mirror S and a totally reflecting concave mirror M. In the light of the reflection on the flat mirror S, a point C is the common centre of the spherical concave surface of the mirror M and of a spherical focal surface R having half the radius of the mirror M. A light source E is placed near the point C and the system formed by the elements S, M, C forms an image C' of the point C at the centre of the entry pupil of the aiming facility; in the drawings, this pupil is shown as being disposed in the plane of the objective $L_1$ but this position of the pupil is not limitative.

Corresponding to each direction D is a point $d$ on the reticule R and the images of the point at infinity in the direction D and the corresponding point $d$ of the reticule R are superimposed upon one another at the point $d'$ in the image plane P; the angle of aiming can be read on the graduations of the reticule R, such graduations appearing in the image plane P.

Figure 2:
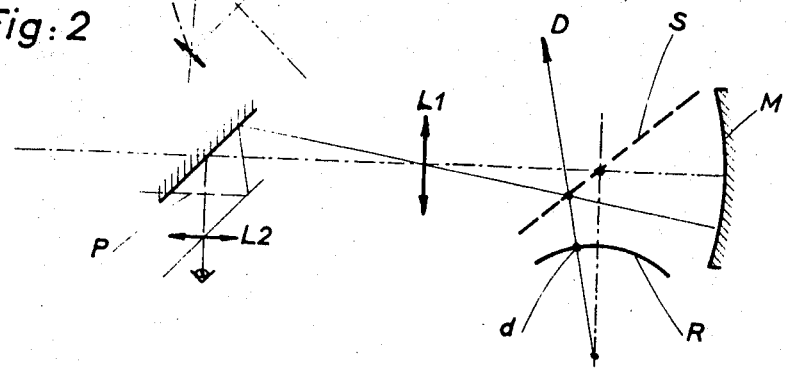
FIGS. 2 and 3 are basic diagrams showing two constructional variants of the optical system formed by the viewer and the collimating mirrors.
Figure 3:
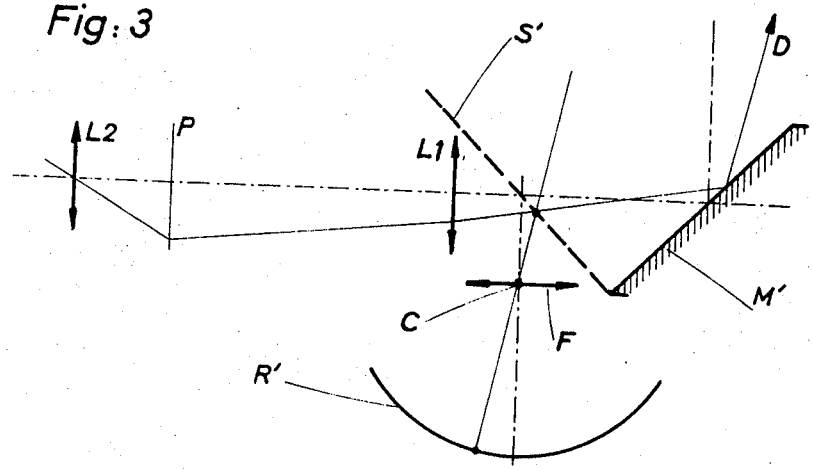

An aiming facility with collimation of this kind is known; the variant shown in FIG. 2 differs from the facility just referred to only in that the axis between the objective $L_1$ and the eyepiece $L_2$ of the facility is broken so that the image is seen the right way round and the observer is placed opposite the target. In the variant shown in FIG. 3, a refractive system can be used which comprises flat mirrors S', M' and which has a field curvature substantially equal to the focal length; this system can operate with a pupil F disposed at the centre C of the field curvature.

The invention is of use with a collimating type aiming facility using any of the known features just mentioned or similar system using a spherical reticule.

According to the invention, the moving system formed by the aiming facility $L_2$, $L_1$ and the mirrors SM or S' M' can rotate around the centre C bearingwise and elevationwise, the reticule R being inscribed, on a sphere which is stationary in space, in accordance with any desired curve and more particularly in meridians, for the bearing angles, and in parallels, for the elevation angles.

FIG. 1 shows that, for instance, for an angle $a$ of rotation of the moving system, the aim in the direction D forming an angle $b$ with the perpendicular to the axis of the facility before rotation becomes an aim in a direction $D_1$, the field of the facility also enabling an aim to be made in the new direction $D_1$. The angle of rotation can be 360°, for instance, bearingwise.

Figure 4:
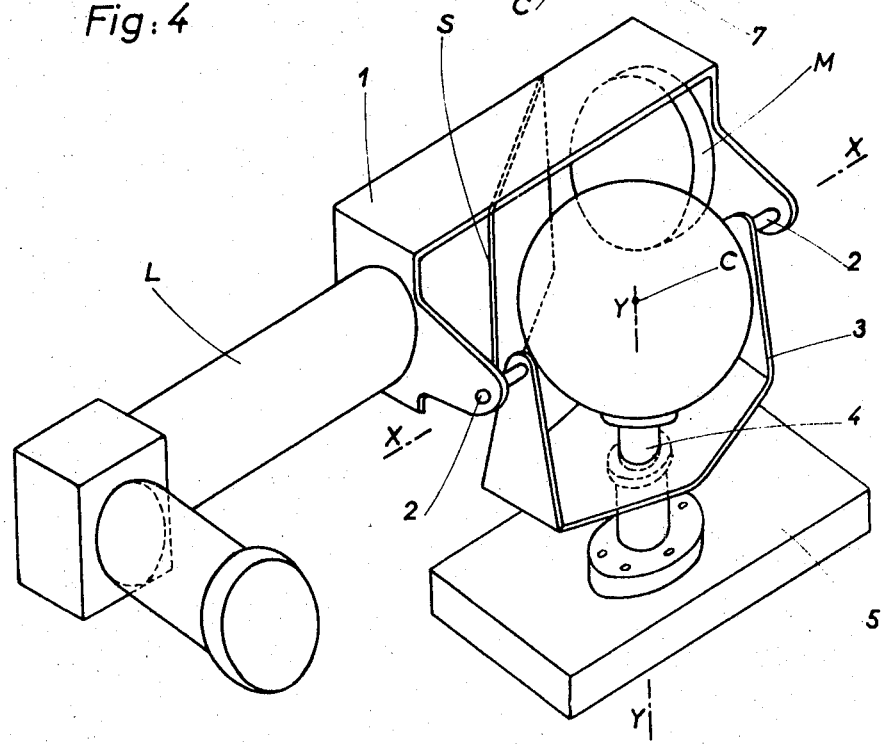
FIG. 4 is a fairly diagrammatic perspective view of an embodiment of an aiming facility in which the moving system has two axes of rotation.

FIG. 4 is a diagrammatic view of a double articulation for a moving system of the kind shown in FIG. 2 for elevation and bearing aiming. The moving system, comprising the viewer L, the flat mirror S and the concave mirror M, is rigidly secured to a support 1 which is connected by two articulations 2, coaxial of a horizontal axis X—X passing through the centre of the sphere, to a bracket or the like 3 rotatable around a pivot 4 disposed on the vertical axis Y—Y passing through the sphere R. Pivot 4 is rigidly secured to fixed base 5 of the facility. The moving system can rotate around the axis X—X for elevation aiming and around the axis Y—Y for bearing aiming.

Figure 5:
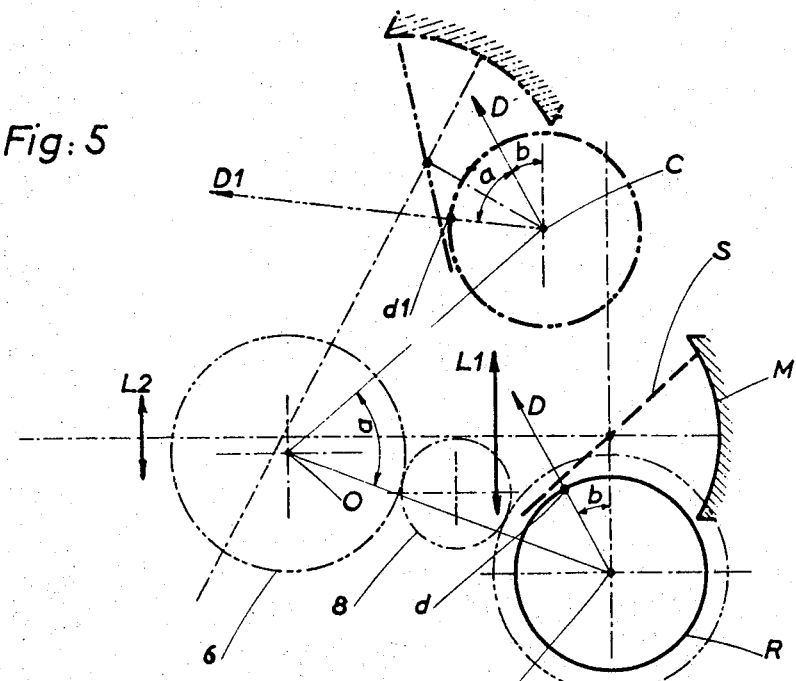
FIG. 5 is a diagrammatic view of an articulation of the aiming facility around an axis eccentric of the spherical reticule.

There may be some cases in which movements around axes which do not pass through the centre of the sphere are required. As FIG. 5 shows, the system $L_2$, $L_1$ S, M, R can be rotated around an axis O, for instance, for bearings. The reticule R is connected to the rotational axis O by means of a geared transmission comprising a gear wheel 6 not participating in the rotation around the point O, and a gear wheel 7 rigidly secured to the reticule R; the gear wheels 6, 7 are of the same diameter as one another and are interconnected by an intermediate wheel 8. Consequently, the orientation of the reticule R in space stays the same for all the angular positions of the moving system. The moving system can move similarly for elevation, the axes of the connecting gear wheels being horizontal in this event.

Of course, parallelogram systems could be used instead of the geared connections.

The special orientation of the special reticule could be maintained without compensating mechanisms by using natural forces of gravity or terrestrial magnetism, in which event the sphere is ballasted and hung in a gimbal mounting and provided with a magnetised rod.

What I claim is:

1. An aiming facility with collimation over an unlimited angle of field comprising a collimating system including an objective, a flat partly reflecting mirror disposed on and at an angle to the optical axis of the objective, a totally reflecting concave spherical mirror having the same field as that of the aiming facility, the concave mirror being centered on the optical axis of the objective with the flat mirror between the objective and the concave mirror, a completely spherical reticule of fixed direction, the center of the reticule being the image of the center of the spherical mirror and having a radius one half the radius of the spherical mirror and viewer on the optical axis of the objective in which the image of a point at infinity is superimposed upon the point of the reticule corresponding to the direction of the point of infinity, and means for mounting the viewer, the objective and the mirrors for rotation around a horizontal axis and around a vertical axis passing through the center of the sphere of the reticule.

2. An aiming facility as set forth in claim 1, the spherical reticule being marked with locating meridians for reading bearing angles and with parallels for reading elevation angles.

3. An aiming facility as set forth in claim 1, including a vertical pivot for the spherical reticule and said mounting means including a support rotatable around a horizontal pivot mounted on a support rotatable around the vertical pivot.

4. An aiming facility with collimation over an unlimited angle of field comprising a collimating system including an objective, a flat partly reflecting mirror disposed on and at an angle to the optical axis of the objective, a totally reflecting concave spherical mirror having the same field as that of the aiming facility, the concave mirror being centered on the optical axis of the objective with the flat mirror between the objective and the concave mirror, a completely spherical reticule of fixed direction, the center of the reticule being the image of the center of the spherical mirror and having a radius one half the radius of the spherical mirror and viewer on the optical axis of the objective in which the image of a point at infinity is superimposed upon the point of the reticule corresponding to the direction of the point of infinity, and means for mounting the viewer, the objective and the mirrors for rotation around a horizontal axis and around a vertical axis passing through the center of the sphere of the reticule, the center of the spherical reticule being horizontally offset from the intersection of the horizontal and vertical axes of the mounting means and including mechanical means for maintaining the orientation of the spherical reticule connected between the spherical reticule and the vertical axes of the mounting means.

References Cited

UNITED STATES PATENTS

| 3,037,284 | 6/1962 | Wagoner et al. | 356—147 |
| 3,084,443 | 4/1963 | Kaatz et al. | 356—140 |

FOREIGN PATENTS

| 764,372 | 12/1956 | Great Britain. |
| 892,227 | 3/1944 | France. |

RONALD L. WIBERT, Primary Examiner

O. B. CHEW II, Assistant Examiner

U.S. Cl. X.R.

350—10